United States Patent

Takikawa et al.

[11] Patent Number: 4,903,643
[45] Date of Patent: Feb. 27, 1990

[54] TEMPERATURE-SENSING FAN FLUID COUPLING

[75] Inventors: Kazunori Takikawa; Yuichi Ono, both of Numazu, Japan

[73] Assignee: Usui Kokusai Sangyo Kaisha Ltd., Sunto, Japan

[21] Appl. No.: 244,698

[22] Filed: Sep. 14, 1988

[30] Foreign Application Priority Data

Sep. 22, 1987 [JP] Japan .................. 62-145048[U]

[51] Int. Cl.⁴ .................................................. F01P 7/02
[52] U.S. Cl. .................................. 123/41.12; 192/82 T
[58] Field of Search .................. 123/41.12; 192/58 B, 192/82 T

[56] References Cited

U.S. PATENT DOCUMENTS 4,653,625 3/1987 Neugebauer .................. 192/82 T

Primary Examiner—Noah P. Kamen
Attorney, Agent, or Firm—Anthony J. Casella; Gerald E. Hespos

[57] ABSTRACT

A temperature-sensing fan fluid coupling for use with an automobile engine. The coupling comprises a sealed enclosure, a partition plate having an outflow control hole, a thermostat mounted upon the front surface of the enclosure, a rodlike link member in contact with the thermostat at its one end, an interlocking member against which the link member bears, and a resilient tonguelike valve member. One end of the valve member is fixed, while the other end is in resilient contact with the front end of the interlocking member. The thermostat is connected to the valve member via the link member and the interlocking member. As the ambient temperature changes, the thermostat deforms to cause the valve member to more or less open the hole.

12 Claims, 2 Drawing Sheets

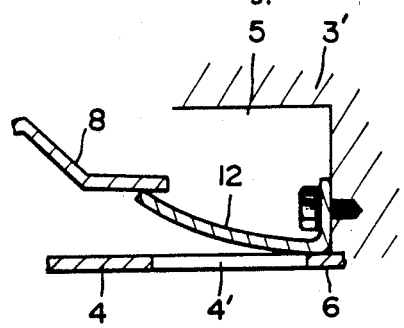
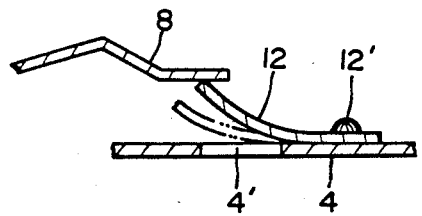
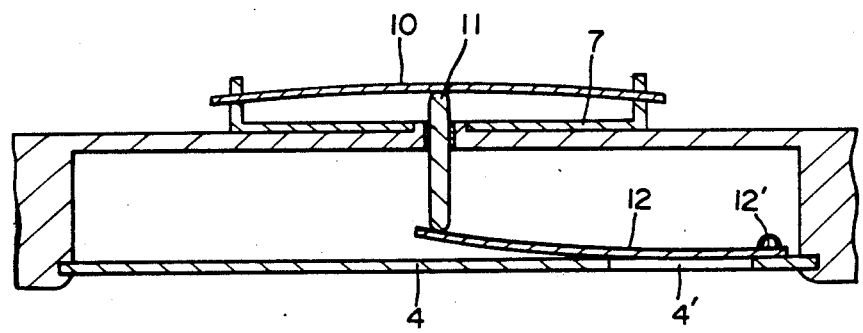
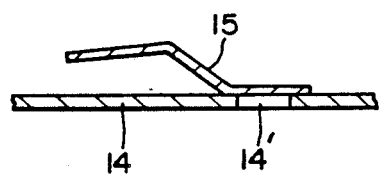
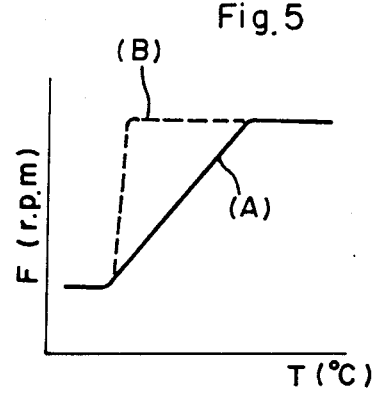

TEMPERATURE-SENSING FAN FLUID COUPLING

BACKGROUND OF THE INVENTION

1. Field of the Invention

The present invention relates to improvements in the structure of a temperature-sensing fan fluid coupling which permits the engine fan of an automobile to be rotated to automatically supply more or less cooling air according to the operating conditions of the engine at all times.

2. Description of the Prior Art

A typical fan fluid coupling of this kind is shown in FIG. 4, where a round hole 14' is formed in a partition plate 14 to control the outflow of oil. A resilient valve member 15 is mounted in the coupling and takes the form of a flat sheet. When temperature varies, a temperature-sensing device (not shown), such as a thermostat, mounted outside deforms, and the valve member 15 interlocks with a rodlike link member (not shown) in response to the deformation. At this time, the flat front end portion of the valve member 15 moves forward or rearward to directly close or open the hole 14'. The characteristic of the coupling is indicated by curve (B) of FIG. 5.

This prior art fan fluid coupling is unable to sufficiently control the outflow of oil, because the hole 14' is directly closed or opened by the flat front end portion of the valve member 15 which moves forward or rearward. As indicated by the characteristic curve (B), the frequency of the fan suddenly changes in a stepwise manner at a predetermined temperature, usually 60° C. under normal operating conditions. Consequently, the amount of cooling air cannot be controlled adequately according to any great temperature change occurring while the vehicle is running. Hence, fan noise and power drain cannot be satisfactorily reduced. Also, the time taken to warm up the engine cannot be shortened sufficiently.

SUMMARY OF THE INVENTION

It is an object of the invention to provide a temperature-sensing fan fluid coupling which allows an appropriate amount of cooling air to be always supplied according to the operating conditions of an engine and in response to temperature changes in such a way that the amount of air is varied substantially continuously.

The invention provides a temperature-sensing fan fluid coupling comprising: a sealed driven enclosure mounted to a rotating main shaft via a bearing, the shaft having a driving disk rigidly fixed thereto at the front end of the shaft, the enclosure having fan blades mounted upon the outer periphery of the enclosure; a partition plate which divides the inside of the enclosure into an oil reservoir chamber and a torque transmission chamber and which is provided with a hole for controlling the outflow of fluid, the disk being mounted inside the torque transmission chamber; a small reservoir formed in the inner side surface of the enclosure which is opposite to the outer side surface of the disk and upon which oil collects during rotation; a circulation passage extending from the torque transmission chamber to the oil reservoir chamber and communicating with the small reservoir; a temperature-sensing device mounted upon the front surface of the enclosure; a rodlike link member which is moved according to deformation of the temperature-sensing device that is caused by temperature changes; and a valve member which, when the ambient temperature exceeds a preset value, is caused to open the hole by the link member and which, when the temperature is lower than the preset value, is caused to close the hole by the link member, the valve member consisting of a resilient tonguelike member mounted inside the fluid coupling. The front end of the link member is resiliently connected to the front end of the resilient tonguelike valve member which is close to the hole and opens or closes it. One end of the valve member is rigidly fixed to the inner wall of the oil reservoir chamber. The effective contact area of oil inside a torque transmission space formed by the opposite surfaces of the disk and the enclosure is increased or decreased to control the torque transmitted from the driving main shaft to the driven enclosure.

In one feature of the invention, said hole for controlling the outflow of fluid extends radially of the partition plate, and the valve member is curved upward.

In this structure, the resilient tonguelike valve member that is close to the hole for controlling the outflow opens or closes the hole. The front end of the link member is either resiliently connected to the valve member via an interlocking member mounted in the oil reservoir chamber or in resilient contact with the valve member. As the ambient temperature changes, the link member moves forward or rearward, and the fulcrum moves continuously from the rigidly fixed point toward the outflow control hole. As a result, the opening of the hole is varied continuously. Consequently, the rotational frequency is in proportion to the temperature of the surroundings as indicated by characteristic curve (A) of FIG. 5, where the temperature (T) is plotted on the horizontal axis and the rotational frequency (F) of the fan on the vertical axis.

Other objects and features of the invention will appear in the course of description thereof which follows.

BRIEF DESCRIPTION OF THE DRAWINGS

FIG. 3(A) is a cross-sectional view taken on line A—A of FIG. 2;

FIGS. 3(B) and 3(C) are views similar to FIG. 3(A), but showing other fan fluid couplings;

FIG. 4 is a view similar to FIG. 3(A), but showing the prior art fan fluid coupling; and FIG. 5 is a graph for comparing the characteristic curve of a fan fluid coupling according to the invention with the characteristic curve of the prior art fan fluid coupling.

DETAILED DESCRIPTION OF THE PREFERRED EMBODIMENTS

Figure 1:
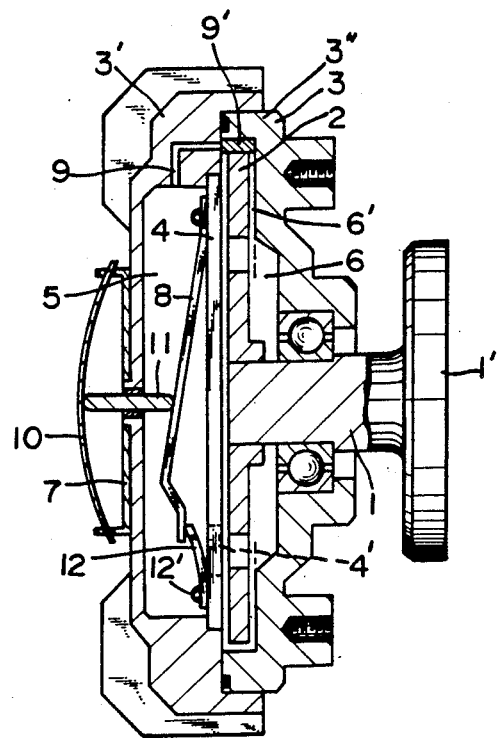
FIG. 1 is a fragmentary vertical cross section of a temperature-sensing fan fluid coupling according to the invention.
Figure 2:
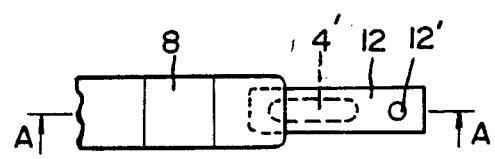
FIG. 2 is an enlarged top view of a main portion of the coupling shown in FIG. 1.

Referring to FIGS. 1–3(C), a driving disk 2 is rigidly fixed to the front end of a rotating main shaft 1 which has a flanged wall 1' at its front end. A casing 3" is mounted on the shaft 1 via a bearing. The casing 3" has a front cover 3' which is sealed to form a sealed driven enclosure 3. The inside of the sealed enclosure 3 is partitioned into an oil reservoir chamber 5 and a torque transmission chamber 6 by a partition plate 4. This partition plate 4 is provided with a hole 4' to control the flow of oil from the oil reservoir chamber 5 to the torque transmission chamber 6. A torque transmission space 6' is formed between the opposite surfaces of the disk 2 and the sealed enclosure 3 inside the torque transmission chamber 6.

A temperature-sensing device 10 consists of a bimetallic strip, for example, both ends of which are anchored to a fixture 7 fixed to the front surface of the cover 3'. One end of an interlocking member 8 is riveted to the surface of the partition plate 4 on the side of the oil reservoir chamber 5, while the other end is located close to the hole 4'. As the ambient temperature changes, the temperature-sensing device 10 deforms, thus deforming the interlocking member 8 via a rodlike link member 11. The interlocking member 8 is disposed inside the oil reservoir chamber 5. A small reservoir 9' is formed in the inner wall surface of the casing 3'' which is opposite to the outer surface of the disk 2 and upon which oil collects. A passage 9 through which oil circulates extends from the torque transmission chamber 6 to the oil reservoir chamber 5. The transmission chamber 6 is close to the small reservoir 9' which is on the upstream side of the passage 9 in the direction of rotation. A resilient tonguelike valve member 12 is located close to the hole 4' that controls the outflow. One end of the valve member 12 is rigidly fixed by a rivet, bolt or screw 12' either to the partition plate 4 or to the cover 3' as shown in FIG. 3(B), while the other end lies over the hole 4' to open or close it. The front end of the valve member 12 is in resilient contact with the front end of the interlocking member 8.

As shown in FIG. 3(C), the link member 11 can be in direct contact with the tonguelike valve member 12 that is made long. Also, the hole 4' which controls the outflow can be made long radially of the partition plate 4. Preferably, the valve member 12 is curved upward.

As described thus far, the novel temperature-sensing fan fluid coupling opens or closes the outflow control hole 4' by the tonguelike valve member 12 always in response to great changes in the ambient temperature which occur while the vehicle is running. Thus, the amount of oil flowing toward the torque transmission chamber 6 can be controlled effectively. Therefore, the amount of cooling air is controlled substantially continuously and appropriately according to the operating conditions of the engine over a wide range. Further, the internal structure is simple, since it consists essentially of the tonguelike valve member 12 alone. In this way, the novel temperature-sensing fan fluid coupling is quite useful.

The amount of cooling air can be controlled more certainly by making the outflow control hole 4' long as mentioned above and, at the same time, curving the valve member 12 upward, in addition to the provision of the above-described structure. Furthermore, the amount of outflow of oil can be controlled continuously as may be desired by appropriately curving the valve member.

What is claimed is:

1. A temperature-sensing fan fluid coupling comprising:
   a rotatable shaft;
   a sealed enclosure rotatably mounted around an end of the shaft, said sealed enclosure comprising a partition dividing the sealed enclosure into a torque transmission chamber substantially surrounding the end of the shaft and an oil reservoir chamber spaced axially from the end of the shaft, said sealed enclosure including a radially outwardly disposed peripheral wall with a circulation passage extending therethrough and connecting radially outwardly disposed portions of the torque transmission chamber with the oil reservoir chamber, said partition of said sealed enclosure being provided with a hole extending therethrough at a location intermediate the peripheral wall of said sealed enclosure and the rotational axis of the shaft;
   a driving disk rigidly fixed to the end of the shaft and disposed within the torque transmission chamber;
   a temperature-sensing device mounted to the sealed enclosure;
   a link member operatively connected to the temperature-sensing device for movement in response to a change in temperature sensed by the temperature-sensing device; and
   valve means disposed within the sealed enclosure for controlling the flow of fluid between the oil reservoir chamber and the torque transmission chamber, said valve means including a first portion rigidly mounted in the sealed enclosure at a location disposed radially outwardly from the hole in the partition, a second portion operatively in contact with the link member for movement therewith, and a third portion intermediate the first and second portions of the valve means, said third portion being disposed generally in line with the hole in the partition and being resiliently deflectable in response to movements of the link member for alternately at least partly opening and at least partly closing the hole between the oil reservoir chamber and the torque transmission chamber, whereby the effective contact area of oil in the torque transmission chamber is varied in response to movements of said valve means for controlling torque transmitted from the shaft to the sealed enclosure.

2. The temperature-sensing fan fluid coupling of claim 1, wherein the valve means comprises an interlocking member defining the second portion of the valve means and a valve member defining the first and third portions of the valve means, the interlocking member having opposed first and second ends, the first end being fixed within the oil reservoir chamber and said second end of the interlocking means being in resilient contact with the valve member, the link member being in contact with the interlocking member of the valve means at a location intermediate the first and second ends of the interlocking member.

3. The temperature-sensing fan fluid coupling of claim 2, wherein one end of the valve member is rigidly fixed to the partition.

4. The temperature-sensing fan fluid coupling of claim 2, wherein one end of the valve member is rigidly fixed to the peripheral wall of the sealed enclosure.

5. The temperature-sensing fan fluid coupling of claim 1, wherein said hole extends radially on the partition, and wherein the valve member is radially aligned and curved away from the partition.

6. The temperature-sensing fan fluid coupling of claim 1 wherein the valve means is generally radially aligned relative to the rotational axis of the shaft and wherein the link is movably mounted relative to the sealed enclosure to contact the valve means at a location generally aligned with the rotational axis of the shaft.

7. The temperature-sensing fan fluid coupling of claim 1 wherein the disk comprises a radially outwardly disposed peripheral surface in spaced relationship to the peripheral wall of the sealed enclosure to define a small reservoir therebetween, the circulation passage formed in the sealed enclosure extending between the small reservoir and the oil reservoir chamber for permitting a flow of fluid therebetween.

8. The temperature-sensing fan fluid coupling of claim 1 wherein the sealed enclosure comprises a casing rotatably mounted to the shaft and a front cover mounted to the casing, the partition being securely mounted to the sealed enclosure intermediate the casing and the front cover.

9. The temperature-sensing fan fluid coupling of claim 8 wherein the temperature-sensing device is mounted to the front cover, and wherein the link extends through the front cover and into contact with the valve means, the link being operative to move in generally axial directions for alternately urging the resilient third portion of the valve means toward and away from the hole in the partition in response to changes in temperature sensed by the temperature sensing device.

10. A temperature-sensing fan fluid coupling comprising:
a rotatable shaft having opposed first and second ends;
a casing rotatably mounted to the shaft intermediate the first and second ends thereof;
a front cover mounted to the casing and defining a sealed enclosure therebetween;
a partition plate mounted intermediate the casing and the front cover and dividing the sealed enclosure into an oil reservoir chamber intermediate the partition plate and the front cover and a torque transmission chamber intermediate the casing and the partition plate, said torque transmission chamber substantially surrounding the first end of the shaft, said partition plate being provided with a hole extending therethrough and connecting the torque transmission chamber to the oil reservoir chamber, the hole being disposed at a location on the partition plate intermediate the rotational axis of the shaft and radially outer peripheral portions of the partition plate;
a temperature-sensing device mounted to the front cover and disposed external to the sealed enclosure;
a rodlike link member extending through the front cover and aligned generally with the rotational axis of the shaft, said link member being operatively connected to the temperature-sensing device for axial movement within the oil reservoir chamber in response to changes in temperature sensed by the temperature-sensing device; and
a valve means disposed in the oil reservoir chamber for controlling fluid flow through the hole in the partition plate, said valve means being generally radially aligned and being in alignment with the hole in the partition plate, said valve means including a first end fixed in the oil reservoir chamber at a location disposed radially outwardly from the hole in the partition plate, said valve means further comprising a portion resiliently curving away from the partition plate and into contact with the rodlike link member, whereby axial movement of the rodlike link member in response to changes in temperature alternately urges the valve means toward or away from the hole in the partition plate.

11. The temperature-sensing fan fluid coupling of claim 10 wherein the valve means is rigidly mounted to the partition plate.

12. The temperature-sensing fan fluid coupling of claim 10 wherein the valve means comprises a valve member rigidly mounted in the oil reservoir chamber at a location generally radially in line with the hole in the partition plate and extending therefrom to a location intermediate the hole and the rotational axis of the shaft, said valve means further comprising an interlocking member rigidly mounted in the oil reservoir chamber at a location therein generally diametrically opposite the rigid mounting of the valve member, said interlocking member being resiliently in contact with the rodlike link member and extending into resilient contact with the valve member, whereby axial movement of the rodlike link member causes movement of the interlocking member which in turn causes movement of the valve member.

* * * * *